US010550931B2

(12) United States Patent
Adams et al.

(10) Patent No.: US 10,550,931 B2
(45) Date of Patent: Feb. 4, 2020

(54) SHIFT CONTROL SYSTEM AND METHOD FOR A VEHICLE HAVING STEERING WHEEL PADDLE SHIFTERS AND A CONSOLE SHIFTER (71) Applicants: James E Adams, Macomb, MI (US); James M Wilder, Farmington Hills, MI (US); Martin Jagoda, IV, Oakland, MI (US)

(72) Inventors: James E Adams, Macomb, MI (US); James M Wilder, Farmington Hills, MI (US); Martin Jagoda, IV, Oakland, MI (US)

(73) Assignee: FCA US LLC, Auburn Hills, MI (US)

( * ) Notice: Subject to any disclaimer, the term of this patent is extended or adjusted under 35 U.S.C. 154(b) by 812 days.

(21) Appl. No.: 15/176,511

(22) Filed: Jun. 8, 2016

(65) Prior Publication Data
US 2016/0363213 A1 Dec. 15, 2016

Related U.S. Application Data (60) Provisional application No. 62/175,708, filed on Jun. 15, 2015.

(51) Int. Cl.
*F16H 59/36* (2006.01)
*F16H 59/02* (2006.01)

(52) U.S. Cl.
CPC .......... *F16H 59/0204* (2013.01); *F16H 59/36* (2013.01); *F16H 2059/0221* (2013.01);
(Continued)

(58) Field of Classification Search
CPC ............. F16H 59/0204; F16H 61/0213; F16H 2059/0221; F16H 2059/0239;
(Continued)

(56) References Cited

U.S. PATENT DOCUMENTS 5,882,277 A * 3/1999 Iizuka ..................... F16H 61/16
477/125
6,474,186 B1 * 11/2002 Vollmar .............. F16H 59/0204
74/335

(Continued)

FOREIGN PATENT DOCUMENTS

DE 102011108951 A1 1/2013
JP 2009-243594 * 10/2009

*Primary Examiner* — William C Joyce
(74) *Attorney, Agent, or Firm* — Ralph E Smith (57) ABSTRACT A shift system and methodology for an automatic transmission of a vehicle is provided. The shift system includes a paddle shifter system configured to be controlled to manually shift gears of the transmission, and a manual gate console shifter system configured to be controlled to manually shift the gears of the transmission when in a manual gate shifting mode. A shift control system is configured to control shifting behavior of the transmission based on whether the paddle shifter system or manual gate shifting mode is activated. When the paddle shifter system is activated, the shift control system automatically upshifts a gear of the transmission when a speed of the engine exceeds a predetermined speed, and when the manual gate shifting mode is activated, the shift control system prevents automatically upshift a transmission gear when the speed of the engine exceeds the predetermined speed.

16 Claims, 4 Drawing Sheets (52) U.S. Cl.
CPC .............. *F16H 2059/0239* (2013.01); *F16H 2059/0247* (2013.01); *F16H 2059/366* (2013.01)

(58) Field of Classification Search
CPC ............ F16H 2059/0247; F16H 61/16; F16H 2061/163; F16H 2061/166
USPC ..... 74/335, 473.18; 701/52, 58; 477/34, 120
See application file for complete search history.

(56) References Cited

U.S. PATENT DOCUMENTS

| | | |
|---|---|---|
| 6,773,369 B2 | 8/2004 | Altenkirch et al. |
| 8,600,635 B2 * | 12/2013 | Wakita ................ F16H 59/0204 477/116 |
| 8,886,420 B2 * | 11/2014 | Shibata .................. F16H 63/42 701/52 |
| 8,996,261 B2 | 3/2015 | Sata |
| 2007/0219046 A1 * | 9/2007 | Fuchs ................ F16H 59/0204 477/78 |
| 2010/0179737 A1 * | 7/2010 | Eriksson ............. F16H 61/0213 701/51 |
| 2011/0061488 A1 | 3/2011 | Walters et al. |
| 2011/0130928 A1 * | 6/2011 | Matsunaga ............. F16H 61/10 701/52 |
| 2012/0144947 A1 | 6/2012 | Herbert et al. |
| 2012/0221200 A1 | 8/2012 | Golomb |
| 2015/0006048 A1 * | 1/2015 | Ly ........................... F16H 61/16 701/58 |

\* cited by examiner

SHIFT CONTROL SYSTEM AND METHOD FOR A VEHICLE HAVING STEERING WHEEL PADDLE SHIFTERS AND A CONSOLE SHIFTER

CROSS-REFERENCE TO RELATED APPLICATIONS

This application claims the benefit of U.S. Provisional Patent Application No. 62/175,708 filed on Jun. 15, 2015, the contents of which are incorporated herein by reference.

FIELD

The present application relates generally to shift systems for vehicles with automatic transmissions and, more particularly, to a shift control system and methodology for a vehicle having paddle shifters and a console shifter, where the vehicle is configured to utilize different control strategies for the paddle shifters versus the console shifter.

SUMMARY

In one exemplary aspect of the invention, a shift system for a vehicle having an engine and an automatic transmission is provided. In one example implementation, the shift system includes a paddle shifter system configured to be controlled by a vehicle driver to manually shift gears of the automatic transmission, and a manual gate console shifter system configured to be controlled by the vehicle driver to manually shift the gears of the automatic transmission when in a manual gate shifting mode. The manual gate console shifter system includes PRND shift locations and a manual gate shift location for activation of the manual gate shifting mode. A shift control system is configured to control shifting behavior of the automatic transmission based on whether the paddle shifter is activated or the manual gate shifting mode is activated via the manual gate console shifter system. When the paddle shifter system is activated, the shift control system automatically upshifts a gear of the automatic transmission when a speed of the engine meets or exceeds a predetermined speed. When the manual gate shifting mode is activated, the shift control system does not automatically upshift a gear of the automatic transmission when the speed of the engine meets or exceeds the predetermined speed.

In another exemplary aspect of the invention, a method of controlling manual-automatic shifting of gears of an automatic transmission of a vehicle is provided. In one example implementation, the method includes determining if a paddle shifter system has been activated, the paddle shifter system configured to be controlled by a vehicle driver to manually shift the gears of the automatic transmission; and determining if a manual gate shifting mode of a manual gate console shifter system has been activated, where the manual gate console shifter system includes PRND shift locations and a manual gate shift location for activation of the manual gate shifting mode, in which the manual gate console shifter system is configured to be controlled by the vehicle driver to manually shift the gears of the automatic transmission. The method further includes performing a first manual-automatic shifting control of the transmission when the paddle shifter system has been activated, where the first manual-automatic shifting control includes automatically upshifting a gear of the transmission when a speed of the engine meets or exceeds a predetermined speed; and performing a second manual-automatic shifting control of the transmission when the manual gate console shifter system has been activated, where the second manual-automatic shifting control includes preventing automatically upshifting a gear of the automatic transmission until a driver command to upshift is received.

DESCRIPTION

Figure 1:
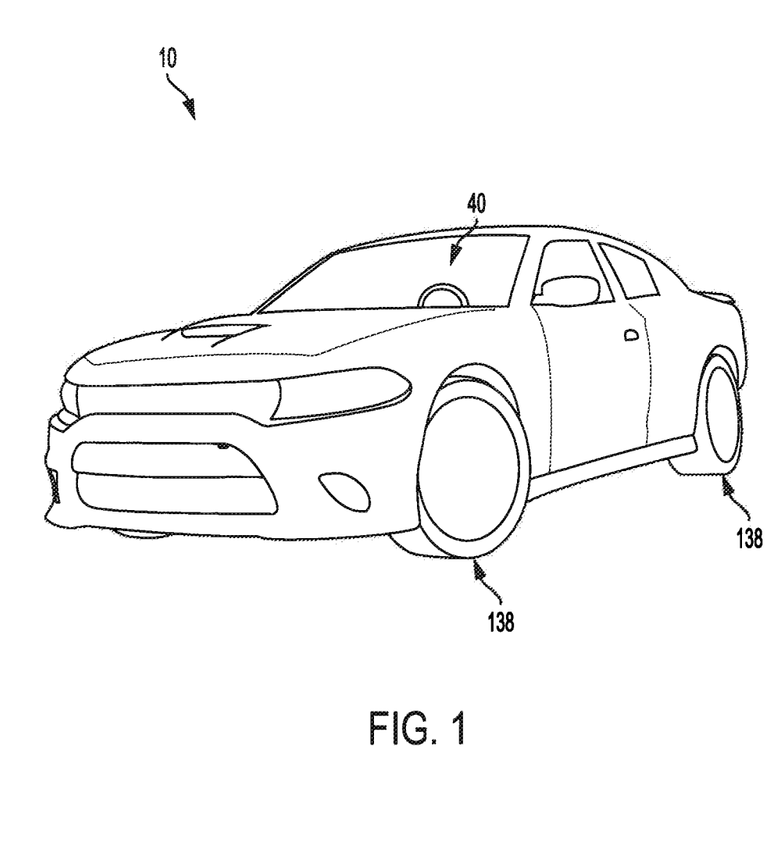
FIG. 1 is a perspective view of an example vehicle in accordance with the principles of the present application.

With initial reference to FIG. 1, an example vehicle is illustrated and generally identified at reference numeral 10. The vehicle 10 includes a shift control system 12 configured to enable a driver to make manual gear changes to the vehicle transmission without having to manipulate a clutch pedal. In accordance with an exemplary aspect of the invention and as will be discussed in greater detail below, the shift control system 12 includes different control strategies for each of a first manual or manual-automatic transmission shifting system and a second manual or manual-automatic transmission shifting system.

In the example implementation, the first manual transmission shifting system includes transmission paddle shifters 20, and the second manual transmission shifting system includes a manual gate (M-Gate) console transmission shifter 30. In general, when the paddle shifters 20 are utilized, the shift control system 12 will automatically upshift transmission gears when the engine speed (RPMs) meets or exceeds a predetermined speed (e.g., redlines), and will automatically time-out (e.g., deactivate) the paddle shifter control after a predetermined time has elapsed since driver input to the paddle shifters 20 such that control reverts to automatic shifting of transmission gears. The automatic time-out may be useful when, for example, the driver accidentally hits the paddle shifters 20 and activates a paddle shifting mode, or when the driver wants to make a single downshift. Moreover, the predetermined time may be varied based on a specific driving mode of the vehicle. When an M-Gate 32 selector or area of console shifter 30 is utilized, the shift control system 12 prevents automatic upshift of transmission gears when the engine speed redlines, and prevents an automatic time-out function to automatically revert to automatic shifting of transmission gears, thereby giving the driver complete manual control over the shifting functions of the vehicle transmission.

Figure 2:
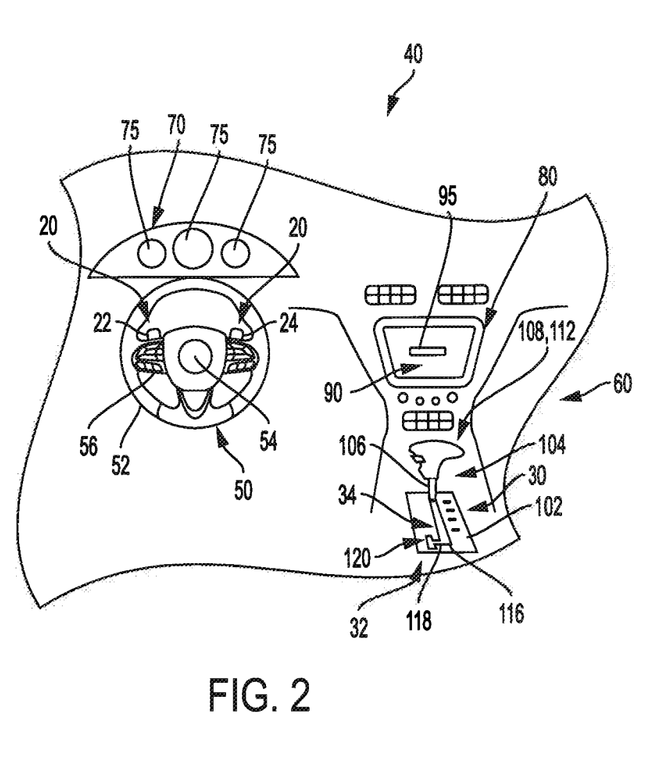
FIG. 2 is a front view of an example vehicle interior having paddle shifters and a console shifter in accordance with the principles of the present application.

With additional reference to FIG. 2, the vehicle 10 generally includes a vehicle interior 40 having a steering wheel 50, a console 60, an instrument cluster 70, and an infotainment system 80. In one example implementation, paddle shifters 20 are associated with steering wheel 50, and M-Gate console shifter 30 is associated with console 60.

The steering wheel 50 generally includes a rim 52 coupled to a hub 54 by one or more spokes 56. In the illustrated example, a left paddle shifter 22 is coupled to and extends upwardly from the left spoke 56, and a right paddle shifter 24 is coupled to and extends upwardly from the right spoke 56. However, paddle shifters 20 may be coupled to various other portions of steering wheel 50 or may alternatively be coupled to a steering column (not shown) of the vehicle.

The paddle shifters 20 can be selectively utilized by a driver to provide manual input in the form of a transmission shift request. In one example implementation, forward and/or rearward movement of left paddle shifter 22 is utilized to provide a shift request to downshift the vehicle transmission by at least one gear per movement (e.g., from second to first gear). Similarly, forward and/or rearward movement of right paddle shifter 24 is utilized to provide a shift request to upshift the vehicle transmission by at least one gear per movement (e.g., from first to second gear). However, it will be appreciated that alternative positioning and/or shifting functions of paddle shifters 20 are contemplated.

The console 60 includes an automatic transmission M-Gate console shifter 30 that includes a Park, Reverse, Neutral and Drive (PRND) transmission gear selector or gate area 34, as well as the M-Gate selector or gate area 32. As such, the M-Gate console shifter 30 can be both a poly-stable or location-stable electronic shifter, where the shifter remains in a gear selection location as positioned by a driver until the driver moves the shifter to a different gear selection location (e.g., selector gate area 34), and a monostable electronic shifter, which returns to a central home position after being placed in a specific gear selection location by the driver (e.g., in selector gate area 32). It will be appreciated that while console shifter 30 is illustrated in console 60, console shifter 30 could be placed in other interior locations, such as an instrument panel or a center stack console.

In the example implementation, M-Gate console shifter 30 generally includes a housing 102 and a shift lever assembly 104. The shift lever assembly 104 is at least partially disposed within housing 102 and generally includes a gear shift lever 106 having a first end 108 and an opposite second end (not shown). First end 108 includes a shift knob 112 configured to be engaged and manipulated by a vehicle driver, and the second end can include a pivot ball (not shown). A cable or rod (not shown) may be coupled at a first end to the gear shift lever 106 proximate a fore/aft pivot point such as the pivot ball, and a second end of the cable/rod may be coupled to a lever on the vehicle transmission. Alternatively, the shift lever assembly 104 could be electronically coupled to the transmission in a shift by wire arrangement.

In an automatic shifting mode, shift lever 106 is disposed within a shaft cavity such that gear shift lever 106 is movable through a first slotted groove or opening 116 of selector gate area 34, which facilitates selection of, for example, a parking position, a neutral position, a reverse position, and a forward drive position (PNRD). As such, gear shift lever 106, which is coupled to the transmission via the cable/rod mechanical linkage, is moved through the slotted opening 116 to shift the setting of the console shifter 30. However, shifter lever assembly 104 may include various other types of shift lever assemblies such as rotary, ball, and yoke pivots or any combination thereof.

In a manual shifting mode, shifter lever 106 is translated laterally through a transition slotted opening 118 to a second slotted groove or opening 120 of M-Gate selector gate area 32. In the example implementation, the second slotted opening 120 enables shift lever 106 to be rocked or rotated in a forward direction and a rearward direction. In the example implementation, forward movement of shifter lever 106 is utilized to downshift the vehicle transmission by at least one gear per movement. Similarly, rearward movement of the shift lever 106 may be utilized to upshift the vehicle transmission by at least one gear per movement. However, other shifting arrangements are contemplated. For example, forward movement may upshift and rearward movement may downshift, or slotted opening 120 may extend laterally such that leftward or rightward movement of the shift lever 106 causes a downshift or upshift of the vehicle transmission.

The instrument cluster 70 may include one or more displays 75 configured to provide information to the driver such as, for example, vehicle speed, engine rotational speed, or current transmission gear. The instrument cluster displays 75 may be utilized to provide information or direction to the driver during manual transmission gear shifting. For example, displays 75 may display a numerical reference indicating the current transmission gear of the vehicle transmission. In addition, display 75 may indicate a current driving or performance mode of the vehicle such as a Street mode, a Sport mode, or a Track mode, discussed herein in more detail.

The infotainment system 80 includes a user interface 90, which is configured to provide audio/visual information about the vehicle to the driver. For example, the user interface 90 may be a touch-screen configured to display one or more soft keys 95 programmed to perform a specific function when selected. In one example implementation, soft key 95 may be selected by the driver to choose a desired vehicle driving/performance mode. For example, soft keys 95 may enable the driver set driving/performance modes (e.g., Street, Sport, Track modes) for the vehicle transmission, vehicle traction, and/or vehicle suspension. Further, soft keys 95 may enable the driver to switch the paddle shifters 20 between an activated state and a deactivated state. In the activated state, the paddle shifters 20 are operable to shift gears of the transmission, while in the deactivated state, the paddle shifters 20 are not operable to shift gears of the transmission. Alternatively, or additionally, paddle shifters 20 may be activated/deactivated by pressing on or otherwise moving or manipulating the paddle shifters 20.

Additionally, user interface 90 may provide audio communications to the driver in place of or in addition to visual displays. Moreover, the user interface 90 may also receive audio commands from the driver. However, the user interface 90 is not limited solely to the function described herein and may be utilized in various other ways to control systems of the vehicle 10.

Figure 3:
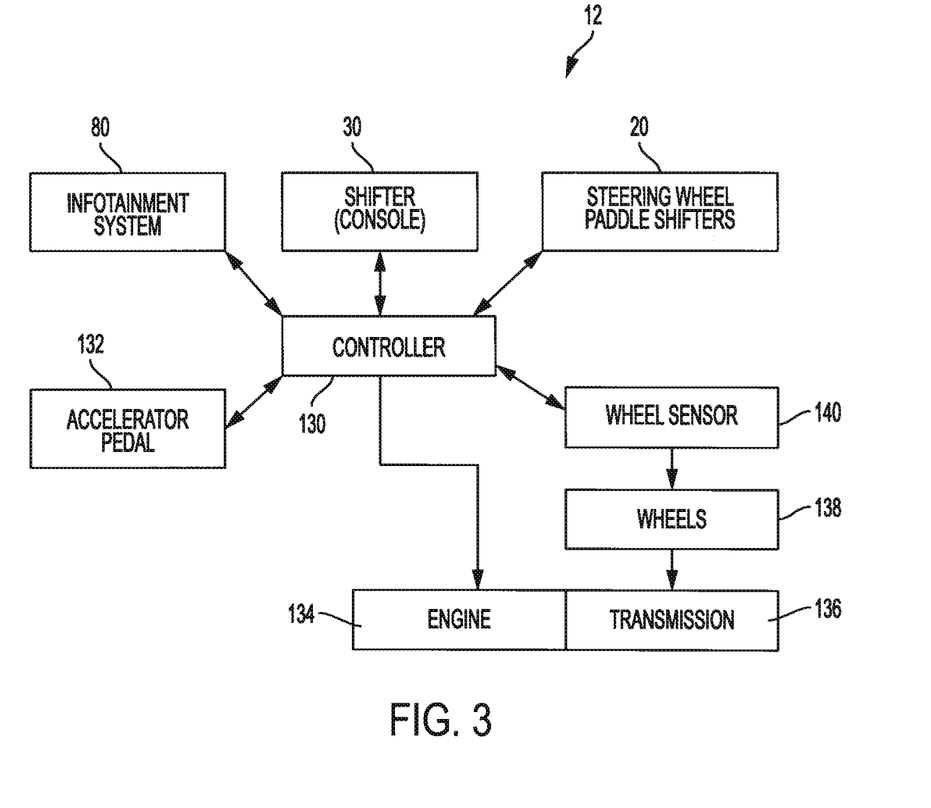
FIG. 3 is a schematic illustration of a vehicle system according to the principles of the present application.

With additional reference to FIG. 3, the shift control system 12 includes or is associated with a vehicle controller 130 such as one or more electronic control systems or vehicle, powertrain or engine controllers. As shown in the example implementation, vehicle controller 130 is in signal communication with a vehicle accelerator pedal 132, infotainment system 80, M-Gate console shifter 30, paddle shifters 20, an engine 134, an automatic transmission 136, one or more wheels 138 associated with the transmission 136, and one or more sensors 140 associated with the one or more wheels 138. Accordingly, controller 130 is configured to receive inputs from the various components, and the inputs may subsequently be utilized to vary and control shifting behavior of the automatic transmission 136.

The shift control system 12 is configured to regulate manual gear shifting of the transmission 136 based on whether the vehicle driver utilizes the paddle shifters 20 or the M-Gate console shifter 30 for manual gear shifting of the transmission 136 via M-Gate selector area 32. As such, shift control system 12 and controller 130 enable different shifting control schemes for each of paddle shifters 20 and M-Gate console shifter 30, thereby creating different transmission shift behavior for the different driver shifter inputs. In general, utilization of the paddle shifters 20 may be configured as a temporary and limited shifting control, and the M-Gate 32 of console shifter 30 may be configured as a full-time, unlimited shifting control.

Figure 4:
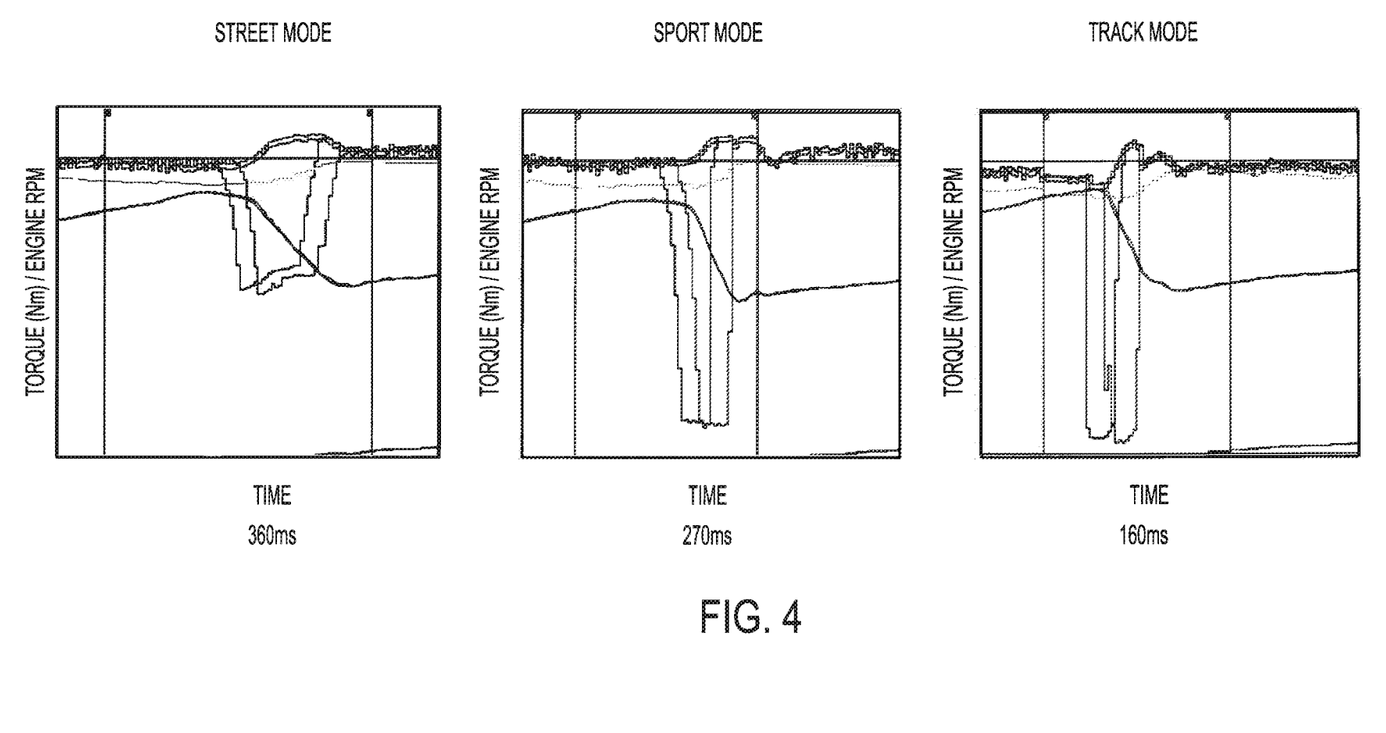
FIG. 4 illustrates graphical representations of exemplary transmission shift times associated with the selectable modes of vehicle operation according to the principles of the present application.

Additionally, in the example implementation, the transmission 136 provides three different shift times for the Street, Sport, and Track modes. Each mode (from Street to Track) further reduces the shift times, with the Track mode offering the shortest and most tactile shifts, as shown for example in FIG. 4, which illustrates engine torque (Nm) over time and engine speed (rpm) over time before, during, and after the shift. Each mode utilizes different shift schedules/maps for transmission shifting. In one exemplary implementation, the shift time for Street mode is or approximately is 360 ms, the shift time for Sport mode is or approximately is 270 ms, and the shift time for Track mode is or approximately is 160 ms. As discussed above, the driver may utilize user interface 90 to select the Street, Sport, and Track modes, which selections may then be displayed on the user interface 90 and/or instrument cluster display 75.

Operation of the shift control system 12 will now be described in more detail. In general, shift control system 12 controls manual-automatic shifting of transmission 136 depending on whether the driver utilizes or activates either of paddle shifters 20 or the M-Gate selector area 32 of console shifter 30.

In operation, when the console shifter 30 is placed in the Drive gear select location, the paddle shifters 20 can be used to manually upshift or downshift the transmission 136. Use of paddle shifters 20 while the console shifter 30 is in the Drive gear select location provides for temporary manual shifting of the transmission 136 and will time-out and revert back to an automatic mode shifting after a predetermined time has elapsed since the driver has utilized the paddle shifters 20. In one exemplary implementation, once the driver actuates one paddle shifter 20 while the console shifter 30 is in the Drive gear select location, the paddle shifter control will time-out after a pre-determined time and revert back to the console shifter 30.

In some implementations, the predetermined time limit increases as the vehicle is transitioned from Street mode (default), to Sport mode, and to Track mode. As such, the Street mode may have the shortest predetermined time limit before reverting back to automatic shifting, while the Track mode may have the longest predetermined time limit. In one exemplary implementation, the time-out period ranges from 10-30 seconds depending on the selected or default vehicle mode of operation. For example, shift control system 12 may revert from paddle shifting back to automatic shifting after 10 seconds of paddle inactivity while in the Street mode, after 20 seconds of paddle inactivity in the Sport mode, and after 30 seconds of paddle inactivity while in the Track mode.

In one exemplary implementation, when the console shifter 30 is in the Drive gear select location and the driver uses and/or engages the paddle shifters 20, the controller 130 commands the vehicle operating mode to change to the next, more aggressive or sportier operating mode. For example, if the vehicle is operating in Street mode with the console shifter 30 in Drive and the paddle shifters 20 are utilized, the shift control system 12 will automatically switch one or more vehicle components to Sport mode, thereby providing quicker and more tactile transmission shifts. Similarly, if the vehicle is in the Sport mode with the console shifter 30 in the Drive gear select location and the paddle shifters 20 are utilized, the shifter control system 12 will automatically switch one or more vehicle components to the Track mode of operation.

In addition, while using the paddle shifters with the console shifter in the Drive gear select location, shift control system 12 will automatically upshift transmission 136 at a predetermined engine RPM (e.g., redline). In one exemplary implementation, shift control system 12 automatically upshifts transmission 136 at redline in this scenario in a manner consistent with or substantially consistent with the manner in which the transmission 136 upshifts at redline when under control of the console shifter 30 with the shift lever 106 in the Drive gear select location.

On the other hand, when the console shifter 30 is positioned in the M-Gate 32 for manual shifting of the automatic transmission 136, the shift lever 106 may be utilized to upshift or downshift automatic transmission 136. However, in one exemplary implementation, when the console shifter 30 is positioned in the M-Gate 32, the M-Gate console shifter 30 will not time-out after any time of shifting inactivity and control does not automatically revert back to the control associated with console shifter 30 in PRND locations after a predetermined time has elapsed. Rather, the shift lever 106 of console shifter 30 will need to be moved from the M-Gate 32 back to automatic gear selector gate area 34 to transfer automatic control back to the console shifter 30.

In additional implementations of shift control system 12, utilization of paddle shifters 20 while console shifter 30 is positioned in the M-Gate mode may provide additional shift behaviors. For example, where the paddle shifters 20 are being utilized while the console shifter 30 is in the M-Gate 32, shift control system 12 may not automatically upshift transmission 136 at redline and/or time-out after a predetermined time has elapsed. In one exemplary implementation, this is consistent with use of the console shifter in the M-Gate 32, where the transmission will obey the driver's commands and likewise not upshift at redline.

As briefly described above, in one exemplary implementation, the paddle shifters 20 can be selectively turned on or off, such as via a soft button 95 on the user interface 90 of the infotainment unit 80. When the paddle shifters 20 are tuned off, the M-Gate 32 will still function and in the same manner as when the paddle shifters 20 are tuned on.

Figure 5:
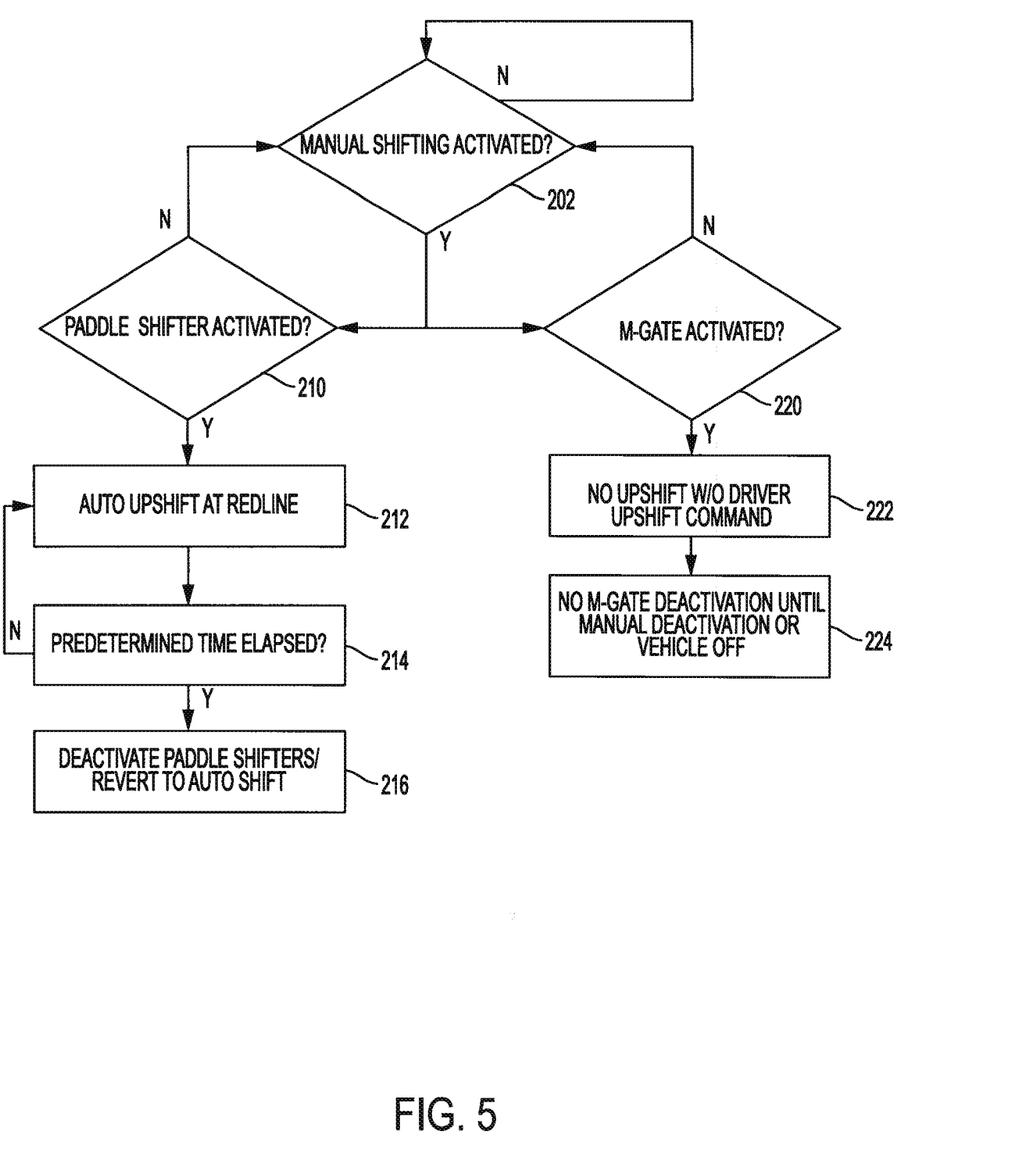
FIG. 5 illustrates an example method of controlling manual shifting of gears of an automatic vehicle transmission according to the principles of the present application.

FIG. 5 illustrates an example method 200 of controlling manual shifting of gears of an automatic vehicle transmission. At step 202 controller 130 determines if the driver has activated a manual transmission gear shifting system. If no, control returns to step 202. If yes, control proceeds to step 210 and/or step 220. At step 210, controller 130 determines if paddle shifters 20 have been activated. For example, a driver may activate the paddle shifters 20 by physically manipulating paddle shifters 20 or through user interface 90. If no, control returns to step 202 or proceeds to step 220. If yes, control proceeds to step 212 where controller 130 automatically upshifts a gear of transmission 136 at a predetermined engine speed. At step 214, controller 130 determines if a predetermined time has elapsed since the last driver input into the paddle shifters 20. If no, control returns to step 212. If yes, at step 216, controller 130 deactivates paddle shifters 130 and reverts to automatic shifting of the gears of transmission 136.

At step 220, controller 130 determines if the M-Gate 32 has been activated. If no, control returns to step 202 or proceeds to step 210. If yes, control proceeds to step 222 where controller 130 does not upshift gears of transmission 130 without a driver command to upshift. At step 224, controller 130 does not deactivate the M-Gate shifter until it is manually deactivated (e.g., return to auto shifter 34) or the vehicle is turned off.

Described herein are systems and methods for controlling manual shifting of an automatic transmission. The system includes a shift control system that controls manual shifting function and behavior based on whether the driver utilizes paddle shifters or an M-Gate of a console shifter to manually shift gears of the transmission. If the paddle shifters are utilized, shift control system automatically upshifts transmission gears at redline, and times-out (e.g., disables) paddle shifting after a predetermined time has elapsed. The predetermined time may vary based on a driving mode of the vehicle. If the M-Gate is utilized, the shift control system will not automatically upshift transmission gears at redline, and will not time-out the M-Gate after a predetermined time has elapsed. As such, the shift control system provides the driver full shifting control for an unlimited time period when utilizing the M-Gate, and limits driver shifting control/timing when utilizing the paddle shifters.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A shift system for a vehicle having an engine and an automatic transmission, the shift system comprising:
    a paddle shifter system configured to be controlled by a vehicle driver to manually shift gears of the automatic transmission;
    a manual gate console shifter system configured to be controlled by the vehicle driver to manually shift the gears of the automatic transmission when in a manual gate shifting mode, the manual gate console shifter system including PRND shift locations and a manual gate shift location for activation of the manual gate shifting mode; and
    a shift control system configured to control shifting behavior of the automatic transmission based on whether the paddle shifter system is activated or the manual gate shifting mode is activated;
    wherein when the paddle shifter system is activated, the shift control system automatically upshifts a gear of the automatic transmission when a speed of the engine meets or exceeds a predetermined speed; and
    wherein when the manual gate shifting mode is activated, the shift control system does not automatically upshift a gear of the automatic transmission when the speed of the engine meets or exceeds the predetermined speed.

2. The shift system of claim 1, wherein the paddle shifter system includes a first paddle shifter and a second paddle shifter each associated with a steering wheel of the vehicle, the first paddle shifter configured to upshift gears of the automatic transmission, and the second paddle shifter configured to downshift gears of the automatic transmission.

3. The shift system of claim 2, wherein when the paddle shifter system is activated, the shift control system automatically deactivates the paddle shifter system after a predetermined time has elapsed and reverts to an automatic shifting of the automatic transmission associated with the manual gate console shifter system.

4. The shift system of claim 3, wherein the control system automatically deactivates the paddle shifter system after the predetermined time has elapsed since a driver input to the paddle shifter system.

5. The shift system of claim 4, wherein when the manual gate shifting mode is activated the shift control system does not automatically deactivate the manual gate shifting mode after a time limit has elapsed since a driver input to the manual gate console shifter system, and requires movement of a shifter of the manual gate console shift system from the manual gate shift location to one of the PRND shift locations to deactivate the manual gate shifting mode.

6. The shift system of claim 5, wherein when the paddle shifter system is activated while the manual gate shifting mode is activated, the shift control system prevents automatic deactivation of the paddle shifter system after the predetermined time has elapsed.

7. The shift system of claim 5, wherein the predetermined time is varied based on driving modes of the vehicle, and wherein the vehicle includes an input device configured to receive input from a vehicle operator indicative of selection of one of the driving modes of the vehicle.

8. The shift system of claim 7, wherein the input device is a user interface, and wherein the driving modes of the vehicle include a first driving mode, a second driving mode, and a third driving mode.

9. The shift system of claim 8, wherein the predetermined time for the first driving mode is approximately 10 seconds, the predetermined time for the second driving mode is approximately 20 seconds, and the predetermined time for the third driving mode is approximately 30 seconds.

10. The shift system of claim 9, wherein the first driving mode is a default street mode, the second driving mode is a sport mode, and the third driving mode is a track mode.

11. A method of controlling manual-automatic shifting of gears of an automatic transmission of a vehicle, the method comprising:
    determining if a paddle shifter system has been activated, the paddle shifter system associated with a steering wheel of the vehicle and configured to be controlled by a vehicle driver to manually shift the gears of the automatic transmission;
    determining if a manual gate shifting mode of a manual gate console shifter system has been activated, the manual gate console shifter system including PRND shift locations and a manual gate shift location for activation of the manual gate shifting mode, in which the manual gate console shifter system is configured to be controlled by the vehicle driver to manually shift the gears of the automatic transmission;
    performing a first manual-automatic shifting control of the automatic transmission when the paddle shifter system has been activated, the first manual-automatic shifting control including automatically upshifting a gear of the transmission when a speed of the engine meets or exceeds a predetermined speed; and
    performing a second manual-automatic shifting control of the automatic transmission when the manual gate shifting mode has been activated, the second manual-automatic shifting control including preventing automatically upshifting a gear of the automatic transmission until a driver command to upshift is received.

12. The method of claim 11, wherein performing the first manual-automatic shifting control further includes, after a predetermined time has elapsed since a driver input to the paddle shifter system, automatically deactivating the paddle shifter system and reverting to an automatic shifting of the automatic transmission associated with the manual gate console shifter system.

13. The method of claim 12, wherein performing the second manual-automatic shifting control further includes preventing deactivation of the manual gear shifting mode until the driver manually deactivates the manual gear shifting mode via movement of a shift lever associated with the manual gate console shift system from the manual gate shift location to one of the PRND shift locations.

14. The method of claim 13, further comprising receiving input from a vehicle input device, the input indicative of selection of one of a plurality of driving modes of the vehicle, the plurality of driving modes including a default street mode, a sport mode, and a track mode.

15. The method of claim 14, further comprising varying the predetermined time for automatically deactivating the paddle shifter system based on the selected driving mode of the vehicle.

16. The method of claim 12, wherein when the paddle shifter system is activated while the manual gate shifting mode is activated, the shift control system prevents automatic deactivation of the paddle shifter system after the predetermined time has elapsed.

* * * * *